United States Patent
Limaye et al.

(10) Patent No.: US 8,065,501 B2
(45) Date of Patent: Nov. 22, 2011

(54) INDEXING A TRANSLATION LOOKASIDE BUFFER (TLB)

(75) Inventors: Deepak Limaye, Austin, TX (US); James Allen, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 12/259,864

(22) Filed: Oct. 28, 2008

(65) Prior Publication Data
US 2010/0106937 A1 Apr. 29, 2010

(51) Int. Cl.
*G06F 12/00* (2006.01)
(52) U.S. Cl. ....................................... 711/206
(58) Field of Classification Search ......................... None
See application file for complete search history.

(56) References Cited

U.S. PATENT DOCUMENTS

| | | | | |
|---|---|---|---|---|
| 6,079,005 A | * | 6/2000 | Witt et al. | 711/213 |
| 6,721,848 B2 | * | 4/2004 | Gaither | 711/122 |
| 7,162,609 B2 | * | 1/2007 | Morrow et al. | 711/207 |
| 7,434,027 B2 | * | 10/2008 | Morrow et al. | 711/207 |

* cited by examiner

*Primary Examiner* — Hiep Nguyen
(74) *Attorney, Agent, or Firm* — Blakely, Sokoloff, Taylor & Zafman LLP

(57) ABSTRACT

A processor is to comprise a central processing unit (CPU), an address generation unit (AGU), an index generation unit and a translation look-aside buffer (TLB). The CPU of the processor is to generate signal to retrieve instructions from a memory. The AGU is to generate a final linear address and an initial linear address after receiving at least three input source values. An index generation unit coupled to the AGU is to generate a set-index value using the bits of at least the three input source values or the bits of the initial linear address even before the bits of the initial linear address are adjusted for carry. A TLB is to generate a physical address using the final linear address and an entry indexed by the set-index value.

20 Claims, 4 Drawing Sheets

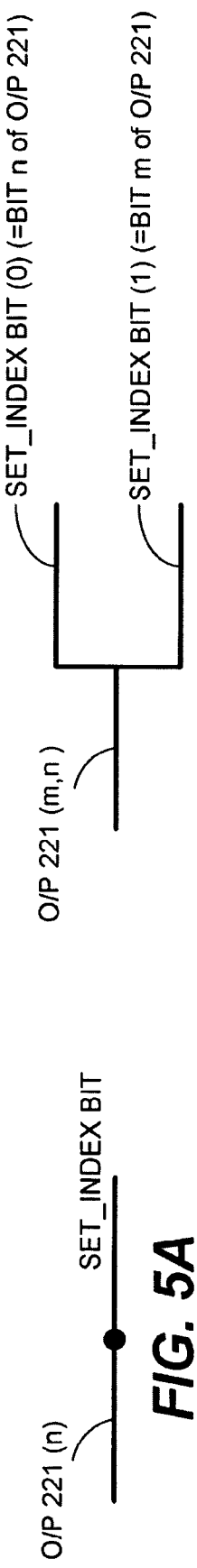
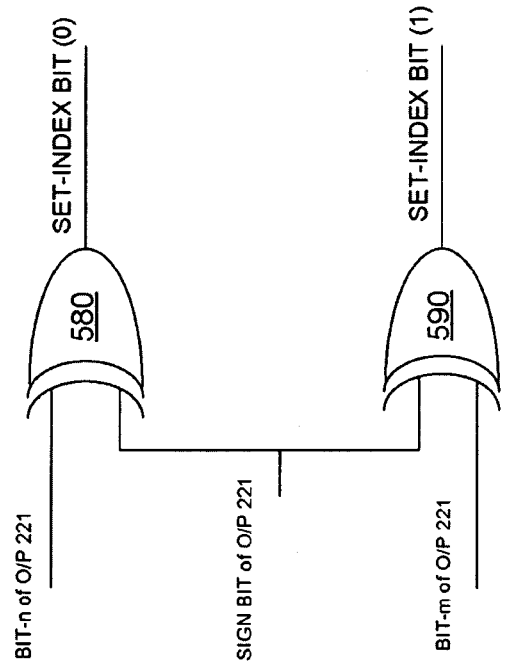
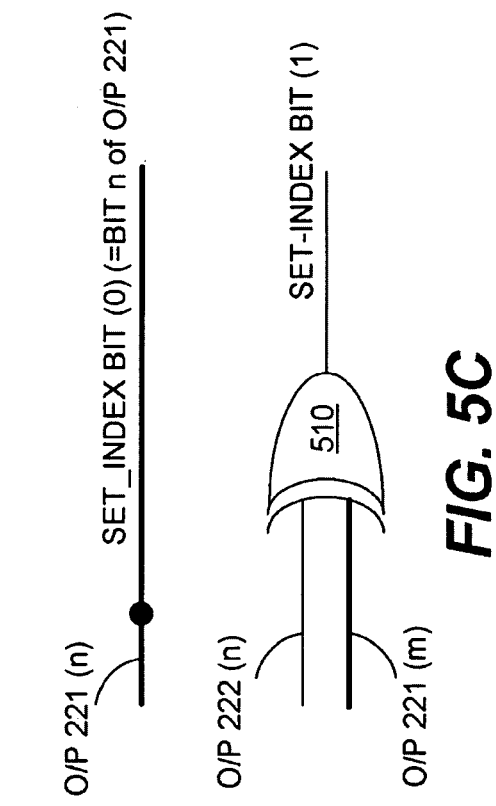

INDEXING A TRANSLATION LOOKASIDE BUFFER (TLB)

BACKGROUND

In a memory subsystem of the computer system, if a physically tagged first level cache is used, the linear address (LA) generated by an address generation unit (AGU) may be translated into a physical address (PA). A translation look-aside buffer (TLB) may translate linear address to physical address. The TLB may comprise a plurality of entries and each entry may comprise a linear address and a corresponding physical address. The linear address generated may be compared with the entries in the TLB to generate a physical address. An increased size of the TLB may decrease the occurrence of TLB misses but, the increase in the size of the TLB may also decrease the speed at which the physical address is generated. It may be required to increase the size of the TLB while maintaining the speed of translation.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIGS. 5A, 5B, 5C, and 5D are logic circuit illustrating the generation of set-index value using the early information present in the initial linear address according to one embodiment.

DETAILED DESCRIPTION

The following description describes embodiments of a technique to index a translation look-aside buffer (TLB). In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
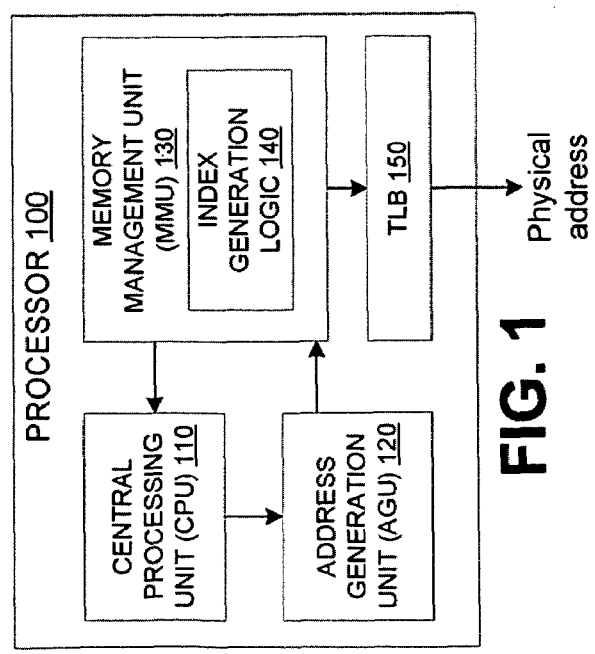
FIG. 1 illustrates a processor 100, which includes a technique for indexing a translation look-aside buffer (TLB) according to one embodiment.

A processor 100, which may support indexing of a translation look-aside buffer (TLB) in accordance with one embodiment is illustrated in FIG. 1. In one embodiment, the processor 100 may comprise a central processing unit (CPU) 110, an address generation unit (AGU) 120, and a memory management unit (MMU) 130.

In one embodiment, the CPU 110 may execute an instruction requiring the contents of a memory location to be loaded. In one embodiment, the CPU 110 may generate a signal to retrieve the contents of the memory location. In one embodiment, the address generation unit (AGU) 120 may generate an initial linear address in response to receiving the signal from the CPU 110. In one embodiment, the AGU 120 may process one or more input source values to generate a linear address. In one embodiment, the AGU 120 may perform addition of the input source values to generate the linear address.

In one embodiment, the MMU 130 may comprise logic circuitry and software to manage the memory. In one embodiment, the MMU 130 may be resident on a chip on which the CPU 110 resides. In other embodiment, the MMU 130 may be located on a separate entity from the CPU 110. In one embodiment, the MMU 130 may comprise an index generation logic 140, which may generate a set_index value using the early information present in the input source values or the initial linear address.

In one embodiment, the TLB 150 may receive the set_index value ahead of receiving the final linear address. In one embodiment, the TLB 150 may use the set_index value to identify an entry among a set of entries stored in the TLB 150. In one embodiment, the TLB 150 may compare the final linear address with the bits stored in an entry indexed by the set_index value and may provide the address associated with the entry as a physical address corresponding to the final linear address. As the TLB 150 may receive the set_index value prior to the final linear address, the TLB 150 may perform the LA to PA translation without having to wait for the set_index value to be generated after the generation of the final linear address.

In one embodiment, the TLB 150 may specify a mapping for a page of the memory. In one embodiment, the entries stored in the TLB 150 may include the physical address for the page, the page size field, permissions field, and the memory type field. In one embodiment, the permissions field may include values to indicate whether the page is readable, writeable, or executable by one or more programs.

Figure 2:
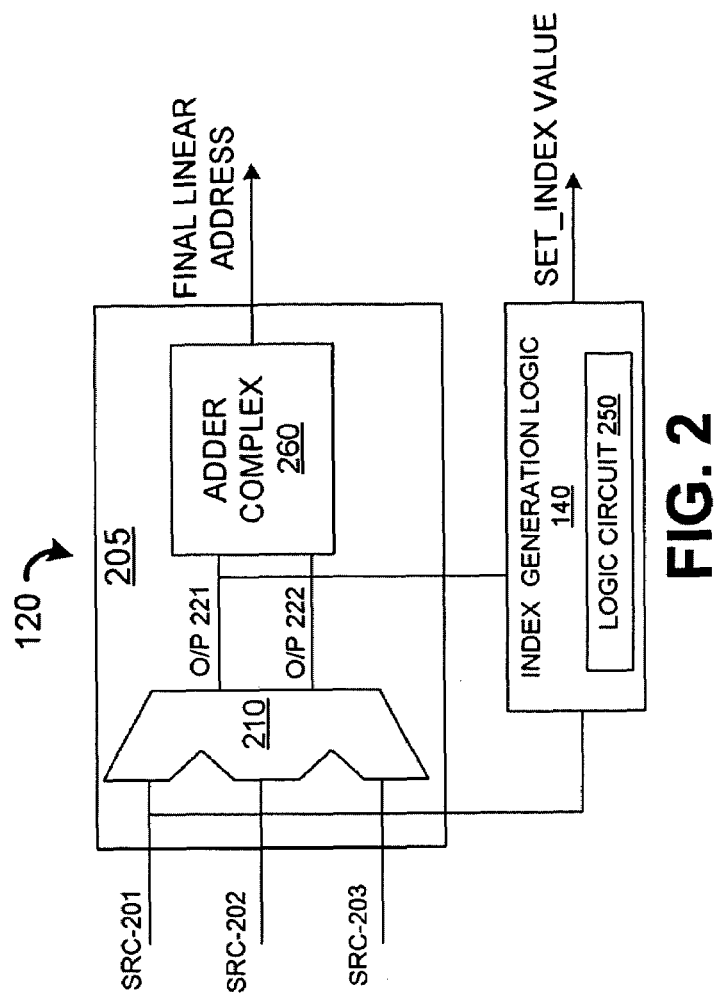
FIG. 2 illustrates an index generation logic used to generate a set-index value using early information present in the input source values or the initial linear address according to one embodiment.

An arrangement 200, which may generate set_index value using early information of the input source values or the initial linear address in accordance with one embodiment is illustrated in FIG. 2. In one embodiment, the arrangement 200 may comprise the AGU 120 and the index generation logic 140 of FIG. 1. In one embodiment, the AGU 120 may generate an initial linear address and a final linear address using hardware logic circuitry 205, which may comprise a compressor 210 and a one or more adders referred to as adder complex 260. In one embodiment, the initial linear address may comprise bits that are generated even before adjusting the carry along the carry chain. In one embodiment, the final linear address may be generated after adjusting the initial linear address with the carry value generated along the carry chain.

In one embodiment, the compressor 210 may receive X input source values and generate Y (<X) outputs. In one embodiment, the compressor 210 may comprise a 3:2 compressor, which may receive 3 (=X) input source values SRC-201, SRC-202, and SRC-203 and may generate an initial linear address comprising a first portion (O/P_221) and a second portion (O/P_222). In other embodiment, the compressor 210 may comprise a 4:2 compressor, which may receive 4 (=X) input source values and generate 2 (=Y) outputs.

In one embodiment, the compressor 210 may receive, for example, three input source values SRC 201, 202, and 203, and may generate a carry and a sum, respectively, as outputs 221 and 222. In one embodiment, the carry and the sum may be generated by performing a logic operation on the position-wise matching bits a, b, and c of the input source values SRC 201, 202, and 203, respectively. In one embodiment, the carry bit may equal ((a AND b) OR (b AND c) OR (a AND c)) and the sum bit may equal (a XOR b XOR c). In one embodiment, a, b, and c may represent bits A(x), B(x), and C(x) in a position x of SRC-201, SRC-202, and SRC-203, respectively. In other embodiment, a, b, and c may represent bits in (x+1) position A(x+1), B(x+1), and C(x+1) of SRC-201, SRC-202, and SRC-203, respectively. In one embodiment, the early information may correspond to the sum bits and the carry bits before the carry is propagated along the carry chain. In one embodiment, the propagation of carry along the carry chain may consume time causing a delay.

In one embodiment, the initial linear address generated by the compressor 210 may be provided as input to the adder complex 260. In one embodiment, the adder complex 260 may comprise a plurality of adders to generate the final linear address in response to receiving the initial linear address. In one embodiment, the adder complex 260 may comprise a sparse carry-merge tree.

In one embodiment, the index generation logic 140 may generate the set_index value using the initial linear address. In one embodiment, while the initial linear address is provided as inputs, the index generation unit 140 may generate the set_index value using the early information present in the initial linear address. In other embodiment, the index generation logic 140 may generate the set_index value using the input source values. In one embodiment, while the input source values are provided as inputs, the index generation unit 140 may generate the set_index value using the early information present in the input source values.

In one embodiment, the index logic unit 140 may comprise logic circuits 250, which may generate the set_index value after receiving the input source values or the initial linear address. In one embodiment, the logic circuit 250 may use chosen bits in the input source values or the initial linear address, without waiting for the carry from the carry chain, to generate the set_index value. In one embodiment, the logic circuit 250 may comprise a set of XOR and AND logic gates to perform bit-wise logic operation to generate the set_index value. In one embodiment, the logic circuit 250, which is to generate the set_index value using the input source values is depicted in FIGS. 4A-4D. In other embodiment, the logic circuit 250, which is to generate the set_index value using the initial linear address is depicted in FIG. 5A-5D.

Figure 3:
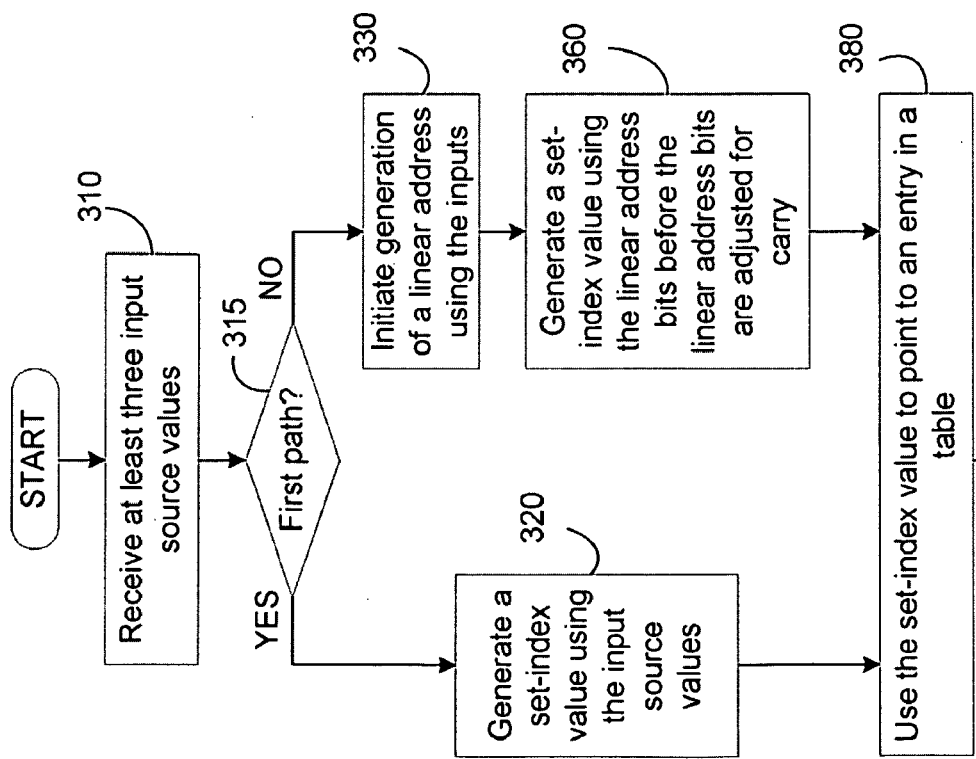
FIG. 3 is a flow diagram illustrating the generation of set-index value using the early information present in the input source values or the initial linear address according to one embodiment.

A flow-chart depicting generation of the set index value using early information of the initial linear address or the input source values in accordance with one embodiment is illustrated in FIG. 3.

In block 310, the AGU 120 may receive at least three inputs such as SRC-201, SRC-202, and SRC-203. In block 315, the index generation logic 140 may check whether to use a first path and control passes to block 320 if the first path is selected and to block 330 otherwise.

In block 320, the index generation logic 140 may generate a set_index value using the input source values and control passes to block 380. In block 330, the AGU 120 may initiate generation of the final linear address using the inputs received in block 310.

In block 360, the index generation unit 140 may generate a set_index value using the initial linear address before the initial linear address bits are adjusted for carry generated along the carry chain. In block 380, the set_index value may be used to point to an entry in the TLB 150.

Figure 4A:
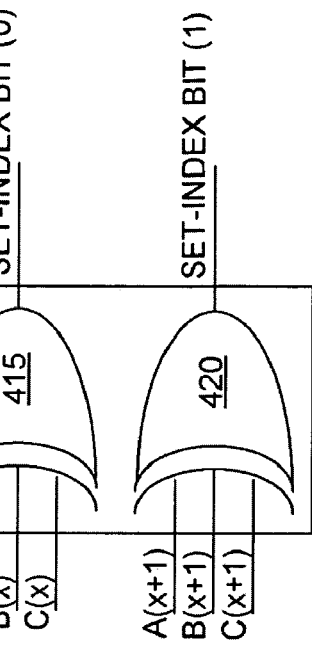
FIGS. 4A, 4B, 4C, and 4D are logic circuit illustrating the generation of set-index value using the early information present in the input source values according to one embodiment.

Logic circuit 250 used to generate the set_index value using the input source values is depicted in FIGS. 4A, 4B, 4C, and 4D. In one embodiment, if the set_index value comprises a bit, the logic circuit 250 may comprise an XOR gate 410 to generate the set_index value as shown in FIG. 4A. In one embodiment, the set_index value may equal the XOR of bits in a position 'x' within the input source values SRC 201, 202 and 203. In one embodiment, the set_index value may be provided by Equation (1) below.

$$\text{Set\_index value} = A(x) \text{ XOR } B(x) \text{ XOR } C(x) \qquad \text{Equation (1)}$$

In one embodiment, the XOR gate 410 may accept input bits A(x), B(x), and C(x) from the three input sources SRC 201, 202, and 203, respectively, and generate an output set_index bit.

In other embodiment, if the set_index value comprises two or more bits, the XOR operation may be performed on each position-wise matching bit combinations. For example, if a first set of bits comprising A(x), B(x), and C(x) and a second set of bits comprising A(x+1), B(x+1), and C(x+1) are used, then the set_index bit value may be computed by performing an XOR operation on each bit, which is as shown in Equation (2) below.

$$\text{Set\_index bit } (0) = A(x) \text{ XOR } B(x) \text{ XOR } C(x); \text{ and}$$
$$\text{Set\_index bit } (1) = A(x+1) \text{ XOR } B(x+1) \text{ XOR } C(x+1) \qquad \text{Equation (2)}$$

Figure 4B:
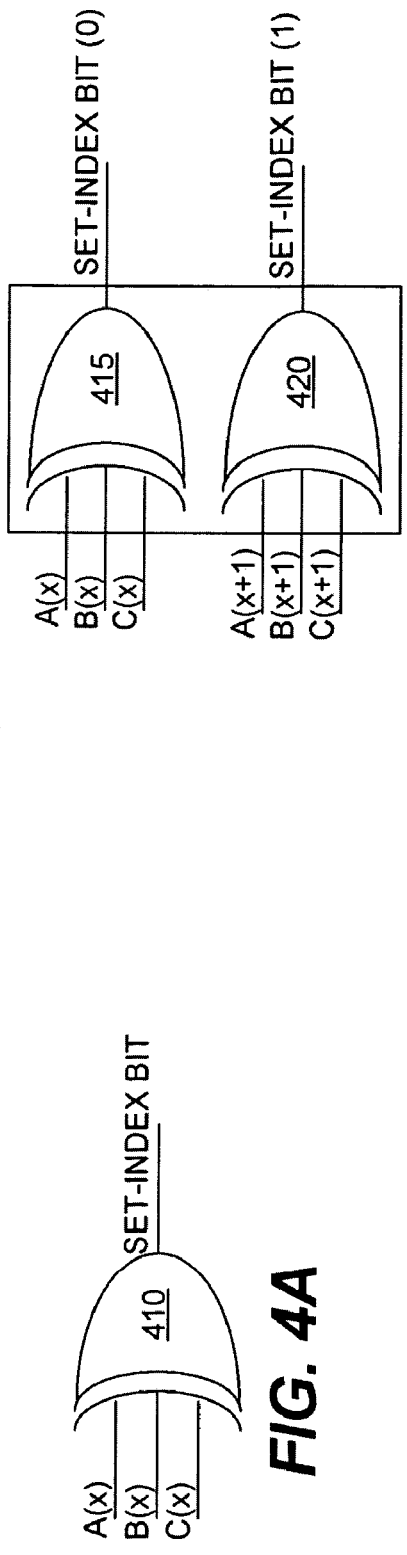

In one embodiment, the logic circuit of FIG. 4B may be used to generate the set_index value comprising two or more bits. In one embodiment, the logic circuit of FIG. 4B may comprise a first XOR gate 415 and a second XOR gate 420 to, respectively, generate the set_index bit (0) and set_index bit (1). In one embodiment, the 3-input XOR gate 415 may accept input bits A(x), B(x), and C(x) from the three input sources SRC 201, 202, and 203 and generate the set_index bit (0). In one embodiment, the XOR gate 420 may accept input bits A(x+1), B(x+1), and C(x+1) from the three input sources SRC 201, 202, and 203, respectively, and generate the set_index bit (1).

Alternatively, the set_index value may be computed by using the local carry, which may be generated substantially sooner compared to the actual final carry for the final linear address. The set_index value, so chosen, may be determined using the Equation (3) below Set_index bit (0)=$A(x)$ XOR $B(x)$ XOR $C(x)$; and
Set_index bit (1)=[$A(x+1)$ XOR $B(x+1)$ XOR $C(x+1)$] XOR [($A(x)$ AND $B(x)$) OR ($B(x)$ AND $C(x)$) OR ($C(x)$ AND $A(x)$)]     Equation (3)

Figure 4C:
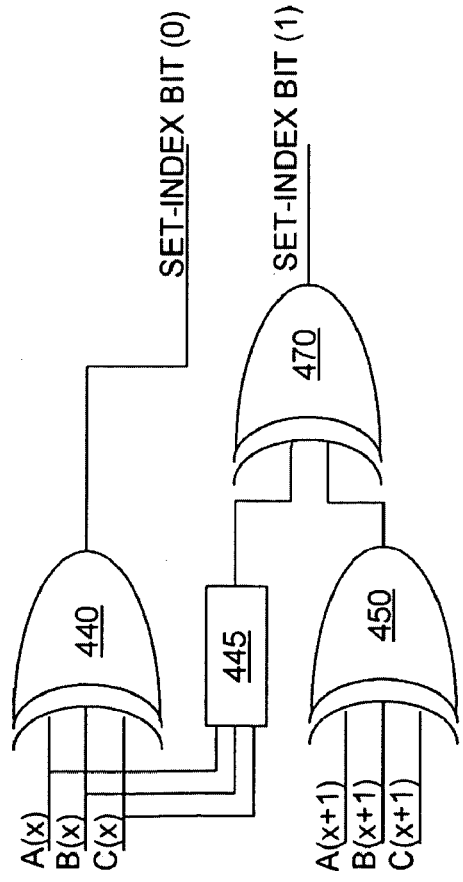

In one embodiment, the Equation (3) may be implemented using the logic circuit depicted in FIG. 4C. In one embodiment, the FIG. 4C is shown comprising three XOR gates 440, 450, and 470 and a logic block 445. In one embodiment, the XOR gate 440 may accept input bits A(x), B(x), and C(x) from the three input sources SRC 201, 202, and 203, respectively, and generate the output set_index bit (0). The XOR gate 450 may accept input bits A(x+1), B(x+1), and C(x+1) from the three input sources SRC 201, 202, and 203, respectively, and generate a first intermediate value. In one embodiment, the logic block 445 may comprise a three AND gates and two OR gates, which may accept input bits A(x), B(x), and C(x) from the three input sources SRC 201, 202, and 203, respectively, and generate a second intermediate value. In one embodiment, the three AND gates and the two OR gates may be used to perform the logic function, which may equal [(A(x) AND B(x)) OR (B(x) AND C(x)) OR (C(x) AND A(x))]. The XOR gate 470 may generate the set_index bit (1) in response to receiving the first and the second intermediate value.

In yet other embodiment, the logic circuit 250 may perform XOR operation on the input bits A(x), B(x), and C(x) and the sign bits A(s), B(s), and C(s) of the input source values SRC 201, 202, and 203. In one embodiment, the set_index value may be generated based on the Equation (4) below.

Set_index value=$A(x)$ XOR $B(x)$ XOR $C(x)$ XOR $A(s)$ XOR $B(s)$ XOR $C(s)$     Equation (4)

Figure 4D:
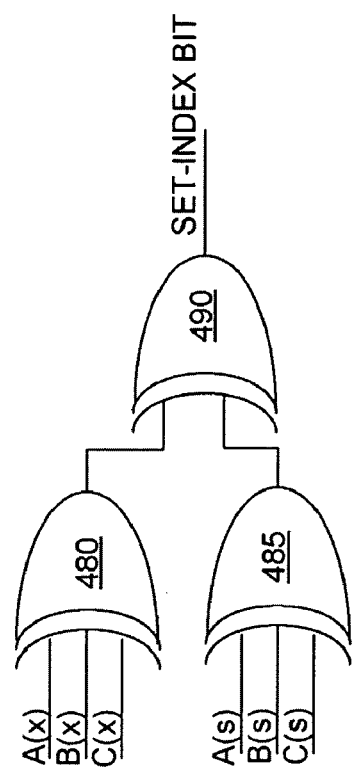

In one embodiment, the Equation (4) may be implemented using the logic circuit depicted in FIG. 4D. In one embodiment, the logic circuit of FIG. 4D may comprise three XOR gates 480, 485, and 490. In one embodiment, the XOR gate 480 may receive the input bits A(x), B(x), and C(x) of the input source values SRC 201, 202, and 203 and may generate a third intermediate value. In one embodiment, the XOR gate 485 may receive the sign bits A(s), B(s), and C(s) of the input source values SRC 201, 202, and 203 and may generate a fourth intermediate value. In one embodiment, the XOR gate 490 may receive the third and the fourth intermediate values as inputs and generate the set_index value.

Logic circuit 250 used to generate the set_index value using the initial linear address (O/P_221 and O/P_222) is depicted in FIGS. 5A, 5B, 5C, and 5D. In one embodiment, if the set_index value comprises a bit, the logic circuit 250 may comprise a bus or a wire, which transfers a bit (n) of the O/P_221 as the set_index bit as shown in FIG. 5A. In one embodiment, if the set_index value comprises two or more bits such as a first and a second bit, the logic circuit 250 may comprise a first and a second bus, which may, respectively, transfer a bit (n) and bit (m) of the O/P_221 as the set_index bit (0) and set_index bit (1) as shown in FIG. 5B.

In other embodiment, if the set_index value comprises two or more bits such as a first and a second bit, the logic circuit 250, as depicted in FIG. 5C, may comprise a bus and an XOR gate 510. In one embodiment, the bus may transfer a bit (n) of the O/P_221 as the set_index bit (0). In one embodiment, the XOR gate 510 may receive bit (m) of the O/P_221 and O/P_222 as the inputs and may perform and XOR operation to generate the set_index bit (1).

In yet other embodiment, if the set_index value comprises two or more bits such as a first and a second bit, the logic circuit 250, as depicted in FIG. 5D, may comprise two XOR gates 580 and 590. In one embodiment, the XOR gate 580 may receive bit (n) of O/P_221 and sign bit of the O/P_221 as the inputs and may perform XOR operation to generate the set_index bit (0). In one embodiment, the XOR gate 590 may receive bit (m) of O/P_221 and sign bit of the O/P_221 as the inputs and may perform XOR operation to generate the set_index bit (1).

Figure 6:
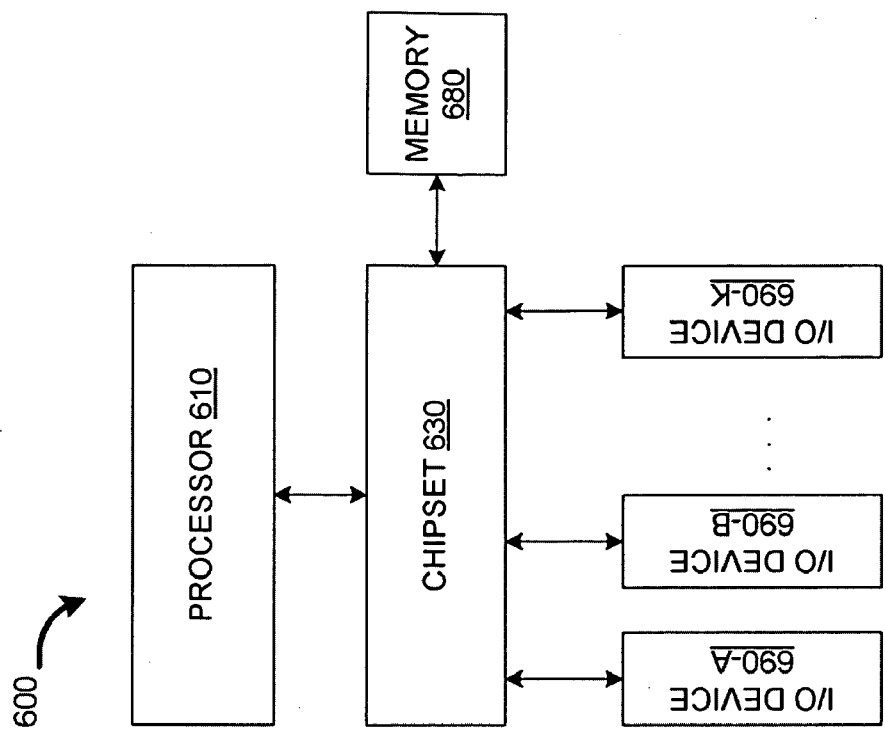
FIG. 6 is a computer system comprising the index generation logic according to one embodiment.

A computer system 600, which may support techniques to index translation look-aside buffer (TLB) in accordance with one embodiment, is illustrated in FIG. 6. In one embodiment, the computer system 600 may comprise some or all of a processor 610, a chipset 630, a memory 680, and I/O devices 690-A to 690-K.

The chipset 630 may comprise one or more integrated circuits or chips that operatively couple the processor 610, the memory 680, and the I/O devices 690. In one embodiment, the chipset 630 may couple the memory 680 and the I/O devices 690 to the processor 610. The chipset 630 may receive transactions generated by the I/O devices 690 on links such as the PCI Express links and may forward the transactions to the memory 680 or the processor 610. Also, the chipset 630 may generate and transmit transactions to the memory 680 and the I/O devices 690 on behalf of the processor 610.

The memory 680 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in a system such as the computer system 600.

The processor 610 may manage various resources and processes within the computer system 600 and may execute software instructions as well. In one embodiment, the processor 610 may comprise a central processing unit, address generation unit, index generation unit, and a TLB. In one embodiment, while the CPU attempts to retrieve data or instructions from the memory, the AGU may generate a linear address. In one embodiment, the index generation unit may generate the index using the early information of the input source values or the initial linear address. In one embodiment, the index may be generated ahead of the generation of a final linear address.

The processor 610 may interface with the chipset 630 to transfer data to the memory 680 and the I/O devices 690. In one embodiment, the processor 610 may retrieve instructions and data from the memory 680, process the data using the instructions, and write-back the results to the memory 680.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus comprising:
    a central processing unit, wherein the central processing unit is to generate signal to retrieve instructions from a memory,
    an address generation unit coupled to the central processing unit, wherein the address generation unit is to generate an initial linear address and a final linear address, wherein the address generation unit is to generate the initial linear address in response to receiving at least three input source values,
    a index generation unit coupled to the address generation unit, wherein the index generation unit is to generate a set-index value using the bits of at least the three input source values, and
    a translation look-aside buffer coupled to the index generation unit, wherein the translation look-aside buffer is to provide a physical address using the final linear address and an entry indexed by the set-index value.

2. The apparatus of claim 1, wherein the index generation unit further comprises a logic circuit to generate the set-index value, wherein the logic circuit is to perform addition of a plurality of bits of the three input source values.

3. The apparatus of claim 2, the logic circuit further comprises a XOR logic gate, wherein the XOR logic gate is to generate the set-index value by performing an XOR operation of a first bit of the three input source values.

4. The apparatus of claim 2, the logic circuit further comprises a first and a second XOR logic gate, if the set-index value comprises a first and a second bit,
    wherein the first XOR gate is to generate the first bit of the set-index value by performing an XOR operation of a first bit of the three input source values, and
    wherein the second XOR gate is to generate the second bit of the set-index value by performing an XOR operation of a second bit of the three input source values.

5. The apparatus of claim 2, the logic circuit further comprises a first, second, and a third XOR gate and a logic block, if the set-index value comprises a first and a second bit, wherein
    the first XOR gate is to perform an XOR operation of a first bit of the three input source values to generate the first bit of the set-index value,
    the second XOR gate is to generate a first intermediate output by performing an XOR operation of a second bit of the three input source values,
    the logic block is to generate a second intermediate output by performing piece-wise AND and OR operation of the first bit of the three input source values, and
    the third XOR gate is to generate the second bit of the set-index value by performing an XOR operation of the first and the second intermediate value.

6. The apparatus of claim 2, the logic circuit comprises a first, second, and a third XOR gate, wherein
    the first XOR gate is to perform an XOR operation of a first bit of the three input source values to generate a first intermediate value,
    the second XOR gate is to perform an XOR operation of the sign bits of the three input source values to generate a second intermediate value, and
    the third XOR gate is to generate the set-index value by performing XOR operation of the first and the second intermediate value.

7. The apparatus of claim 1, the index generation unit further comprises a logic circuit, wherein the logic circuit is to generate the set-index value using the bits of the initial linear address before the initial linear address is adjusted for carry.

8. The apparatus of claim 7, the logic circuit further comprises a first bus, wherein the first bus is to transfer a first bit of a first portion of the initial linear address as the set-index value, if the set-index value comprises a bit.

9. The apparatus of claim 7, the logic circuit further comprises a first and a second bus, if the set-index value comprises a first and a second bit, wherein
    the first bus is to transfer a first bit of a first portion of the initial linear address as the first bit of the set-index value, and
    the second bus is to transfer a second bit of the first portion of the initial linear address as the second bit of the set-index value.

10. The apparatus of claim 7, the logic circuit further comprises a first bus and a first XOR gate, if the set-index value comprises a first and a second bit, wherein
    the first bus is to transfer a first bit of a first portion of the initial linear address as the first bit of the set-index value, and
    the first XOR gate is to perform an XOR operation of a first bit of a second portion of the initial linear address and a second bit of the first portion of the initial linear address as the second bit of the set-index value.

11. The apparatus of claim 7, the logic circuit further comprises a first and a second XOR gate, if the set-index values comprises a first and a second bit, wherein
    the first XOR gate is to perform an XOR operation of a first bit of a first portion of the initial linear address and a sign bit of the first portion of the initial linear address as the first bit of the set-index value, and
    the second XOR gate is to perform an XOR operation of a second bit of the first portion of the initial linear address and the sign bit of the first portion of the initial linear address as the second bit of the set-index value.

12. A method of indexing a translation look-aside buffer comprising:
    receiving at least three input source values,
    generating an initial linear address and a final linear address after receiving at least three input source values,
    generating a set-index value using the bits of the three input source values, if a first path is selected
    generating the set-index value using the bits of the initial linear address before the bits of the initial linear address are adjusted for carry, if a first path is not selected, and
    providing a physical address using the final linear address and an entry indexed by the set-index value.

13. The method of claim 12, wherein the set-index value is generated by performing addition of a plurality of bits of the three input source values.

14. The method of claim 13, wherein the set-index value is generated by performing an XOR operation of a first bit of the three input source values if the set-index value comprises a bit.

15. The method of claim 13, wherein the set-index value comprises a first and a second bit, wherein
    the first bit of the set-index value is generated by performing an XOR operation of a first bit of the three input source values, and
    the second bit of the set-index value is generated by performing an XOR operation of a second bit of the three input source values.

16. The method of claim 13, wherein the set-index value comprises a first and a second bit, wherein
    the first bit of the set-index value is generated by performing an XOR operation of a first bit of the three input source values, a first intermediate output is generated by performing an XOR operation of a second bit of the three input source values, a second intermediate output is generated by performing piece-wise AND and OR operation of the first bit of the three input source values, and the second bit of the set-index value is generated by performing an XOR operation of the first and the second intermediate value.

17. The method of claim 13, wherein a first intermediate value is generated by performing an XOR operation of a first bit of the three input source values, a second intermediate value is generated by performing an XOR operation of the sign bits of the three input source values, and the set-index value is generated by performing XOR operation of the first and the second intermediate value.

18. The method of claim 12, the set-index value is generated using the bits of the initial linear address before the initial linear address is adjusted for carry.

19. The method of claim 18, wherein a first bit of a first portion of the initial linear address is the set-index value, if the set-index value comprises a bit, the first bit of the first portion of the initial linear address is the first bit of the set-index value and a second bit of the first portion of the initial linear address is the second bit of the set-index value, if the set-index value comprises two bits.

20. The method of claim 18, wherein the set-index value comprises a first and a second bit, wherein the first bit of the first portion of the initial linear address is the first bit of the set-index value, and the second bit of the set-index value is generated by performing an XOR operation of a first bit of a second portion of the initial linear address and a second bit of the first portion of the initial linear address.

* * * * *